No. 693,056. Patented Feb. 11, 1902.
S. OAKMAN.
PRESERVE JAR.
(Application filed Feb. 19, 1901.)
(No Model.)

WITNESSES INVENTOR

UNITED STATES PATENT OFFICE.

SAMUEL OAKMAN, OF CHESHIRE, MASSACHUSETTS, ASSIGNOR TO ANGELINE C. OAKMAN, OF CHESHIRE, MASSACHUSETTS.

PRESERVE-JAR.

SPECIFICATION forming part of Letters Patent No. 693,056, dated February 11, 1902.

Application filed February 19, 1901. Serial No. 47,974. (No model.)

*To all whom it may concern:*

Be it known that I, SAMUEL OAKMAN, of Cheshire, in the county of Berkshire and State of Massachusetts, have invented a new and useful Improvement in Preserve-Jars, of which the following, taken in connection with the accompanying drawings, is a specification.

My invention relates to a vessel made of glass or earthenware, so formed inside and out that it is particularly adapted for butter, as it will keep it fresh indefinitely, serves as a good receptacle for transportation, and also as a dish for table use. The vessel may also be used as a preserve-jar, as it admits of perfect sealing.

The object is to produce a vessel that shall serve as a preserver of its contents, be safe in transportation, and one from which the contents can be readily taken without trouble and without in any manner injuring the same by breaking up or forcing out of shape. These objects I attain by the construction shown in the accompanying drawings, in which—

Figure 1:
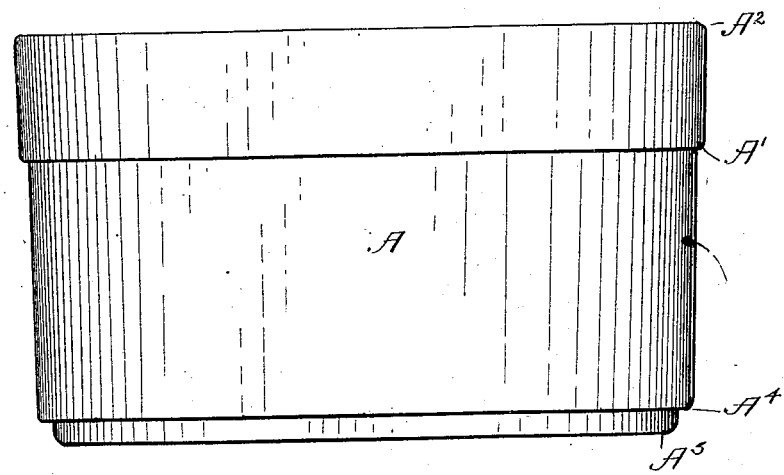
Figure 2:
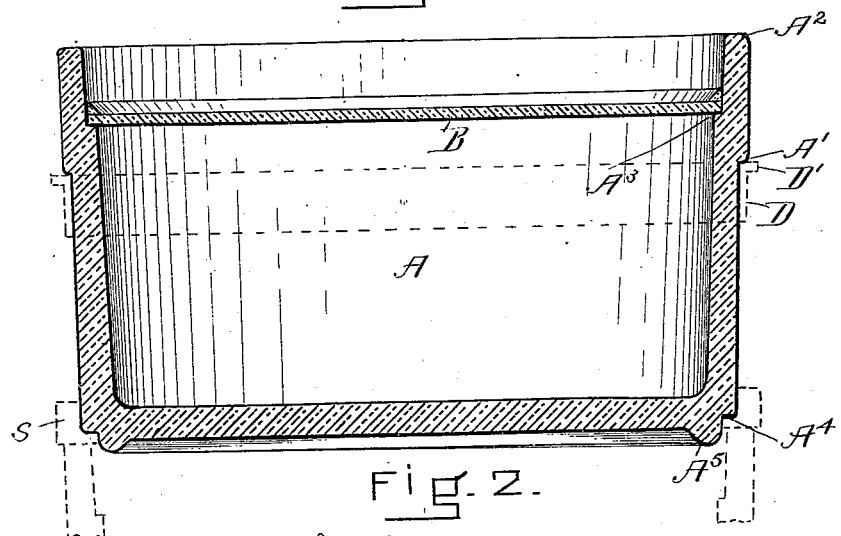
Figures 3, 4:
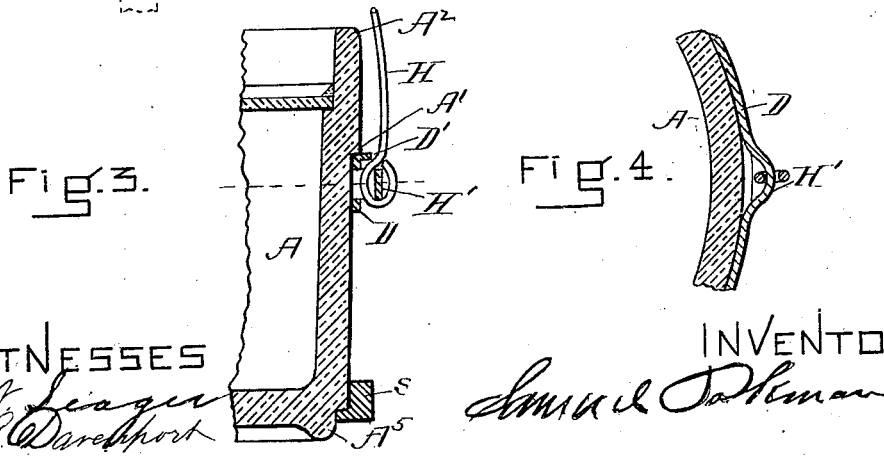

Figure 1 is an elevation showing the external configuration of my preserve-jar. Fig. 2 is a vertical section of the same, indicating in dotted lines parts of a second jar upon which the one represented in full lines is supposed to be sitting in case one is placed upon the other, dotted lines also indicating sections of a sabot about the bottom and also a bail-band. Figs. 3 and 4 show details in section.

The vessel is shown in elevation in Fig. 1. The external members consist of the upper part $A'$ $A^2$, which forms a shoulder at $A'$ with the body part A. A second shoulder $A^4$ and a bead member $A^5$ form the lower circular edge of the vessel.

The interior of the vessel is shown in Fig. 2 and is entirely smooth, without break or contraction of any kind in that part that is to be used for holding butter or preserves. The interior ledge at $A^3$ is for the purpose of supporting the cover or lid B, which may be sealed with any suitable material.

This jar is especially adapted for butter, as it admits of sealing the same when it is desired to preserve the butter for a long period, and it admits of removing the butter in a single piece to be placed upon a suitable table-dish, or the jar may be used for that purpose. As a jar for holding "whole" preserves it is very useful, as preserved fruit may be placed in it and taken from it whole and uninjured.

If desirable, the lid B may have a small handle or depression for convenience in handling.

To render this jar safe in transportation, I have provided a band D D' under the shoulder $A'$, Figs. 2 and 3. This band has a member D', which extends beyond any part of the glass jar and will act as a fender to prevent contact. This band D D' also serves for connecting the bail H, Figs. 3 and 4. This connection is made by means of a loop H', formed by stamping a section of the band so as to form the said loop. A band S, preferably made of a yielding material—paper, for instance—is placed at the lower edge, as shown in Figs. 2 and 3. This acts not only as a fender against any lateral impact, but also as a sabot to protect itself and the upper edge of the jar beneath it, as shown in Fig. 2, the dotted lines in said figure representing the upper part of the said jar.

I claim—

A preserve-jar comprising a jar proper having near its upper edge an exterior and interior shoulder, the exterior shoulder adapted to hold a fender-band, and the interior shoulder adapted to hold a cover and the sealing material, the lower edge of the jar having a shoulder adapted to hold a band to act as a fender against adjacent jars, and as a cushion to rest upon the subjacent jar; and said bands substantially as and for the purpose set forth.

In testimony whereof I have signed my name to this specification, in the presence of two subscribing witnesses, on this 15th day of February, A. D. 1901.

SAMUEL OAKMAN.

Witnesses:
 C. D. BEEBE,
 CHAS. W. SEAGER.